(12) United States Patent
Jung

(10) Patent No.: US 11,935,398 B1
(45) Date of Patent: *Mar. 19, 2024

(54) ELECTRONIC APPARATUS, REMOTE CONTROL APPARATUS, CONTROL METHOD THEREOF, AND ELECTRONIC SYSTEM

(71) Applicant: SAMSUNG ELECTRONICS CO., LTD., Suwon-si (KR)

(72) Inventor: Kyung-hee Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/954,398

(22) Filed: Sep. 28, 2022

Related U.S. Application Data

(63) Continuation of application No. 16/872,408, filed on May 12, 2020, now Pat. No. 11,482,094, which is a
(Continued)

(30) Foreign Application Priority Data

Nov. 6, 2015 (KR) .................. 10-2015-0155547

(51) Int. Cl.
*G08C 17/00* (2006.01)
*H04N 21/422* (2011.01)
(Continued)

(52) U.S. Cl.
CPC ........... *G08C 17/00* (2013.01); *H04N 21/422* (2013.01); *H04N 21/42204* (2013.01);
(Continued)

(58) Field of Classification Search
CPC .................. G08C 17/00; G08C 2201/21; G08C 2201/92; G08C 2201/93; H04N 21/422;
(Continued)

(56) References Cited

U.S. PATENT DOCUMENTS 7,450,148 B2   11/2008   Kim et al.
7,774,527 B2   8/2010    Kim et al.
(Continued)

FOREIGN PATENT DOCUMENTS

CN   102144400 A   8/2011
CN   103634633 A   3/2014
(Continued)

OTHER PUBLICATIONS

Chinese Office Action dated Nov. 8, 2022 for Chinese Application No. 202110497675.1.
(Continued)

*Primary Examiner* — Jeff A Burke
*Assistant Examiner* — Sihar A Karwan
(74) *Attorney, Agent, or Firm* — Nixon & Vanderhye P.C.

(57) ABSTRACT

An electronic apparatus is provided. The electronic apparatus includes: a storage configured to store control code sets corresponding to each of a display apparatus and one or more external electronic apparatuses providing contents to the display apparatus; a communicator comprising communication circuitry configured to communicate with the display apparatus and a remote control apparatus; and a processor configured to determine a source apparatus, providing a content that is currently displayed on the display apparatus, of the display apparatus and the one or more external electronic apparatuses, and controlling the communication circuitry of the communicator to transmit a control code set corresponding to the determined source apparatus to the remote control apparatus.

15 Claims, 17 Drawing Sheets

Related U.S. Application Data continuation of application No. 15/337,116, filed on Oct. 28, 2016, now abandoned.

(51) Int. Cl.
  *H04N 21/436* (2011.01)
  *H04N 21/442* (2011.01)
  *H04N 21/41* (2011.01)

(52) U.S. Cl.
  CPC . *H04N 21/43615* (2013.01); *H04N 21/44231* (2013.01); *G08C 2201/21* (2013.01); *G08C 2201/92* (2013.01); *G08C 2201/93* (2013.01); *H04N 21/41265* (2020.08); *H04N 21/42208* (2013.01); *H04N 21/42226* (2013.01)

(58) Field of Classification Search
  CPC ....... H04N 21/42204; H04N 21/43615; H04N 21/44231; H04N 21/41265; H04N 21/42208; H04N 21/42226
  See application file for complete search history.

(56) References Cited

U.S. PATENT DOCUMENTS

| | | |
|---|---|---|
| 7,853,732 B2 | 12/2010 | Kim et al. |
| 8,214,863 B2 | 7/2012 | Kim et al. |
| 9,231,636 B2 | 1/2016 | Kim et al. |
| 2002/0101358 A1 | 8/2002 | De Bolster et al. |
| 2005/0033887 A1 | 2/2005 | Kim et al. |
| 2005/0034160 A1 | 2/2005 | Kim et al. |
| 2005/0065619 A1 | 3/2005 | Kim et al. |
| 2005/0102699 A1 | 5/2005 | Kim et al. |
| 2005/0166241 A1 | 7/2005 | Kim et al. |
| 2010/0037180 A1 | 2/2010 | Elias |
| 2011/0211131 A1 | 9/2011 | Kikuchi et al. |
| 2011/0219404 A1 | 9/2011 | Tsai |
| 2011/0298581 A1 | 12/2011 | Hsu |
| 2014/0055675 A1 | 2/2014 | An et al. |
| 2014/0139749 A1 | 4/2014 | Kim et al. |
| 2014/0240609 A1 | 8/2014 | Choi et al. |
| 2014/0341585 A1 | 11/2014 | Lee |
| 2015/0179061 A1 | 6/2015 | Kim et al. |

FOREIGN PATENT DOCUMENTS

| | | |
|---|---|---|
| EP | 2 337 353 A1 | 6/2011 |
| JP | 2005-136486 | 5/2005 |
| KR | 10-2005-0023126 | 3/2005 |
| KR | 10-2009-0030181 | 3/2009 |
| KR | 10-1069876 | 9/2011 |
| KR | 10-1121778 | 2/2012 |
| KR | 10-2014-0064141 A | 5/2014 |
| KR | 10-2014-0135433 | 11/2014 |

OTHER PUBLICATIONS

U.S. Appl. No. 16/872,408, filed May 12, 2022; Jung.
U.S. Appl. No. 15/337,116, filed Oct. 28, 2016; Jung.
Search Report and Written Opinion dated Feb. 13, 2017 in counterpart International Patent Application No. PCT/KR2016/012424.
European Extended Search Report for EP Application No. 16862375.9 dated Jul. 10, 2018.
Chinese Office Action dated May 26, 2020 for Chinese Application No. 201680064704.2.
European Examination Report dated Mar. 11, 2021 for EP Application No. 16862375.9.
Korean Office Action dated Oct. 18, 2021 for KR Application No. 10-2015-0155547.
European Extended Search Report dated Sep. 8, 2022 for EP Application No. 22151165.2.
Chinese Office Action dated Jun. 29, 2023 for Chinese Application No. 202110497675.1.
Summons to Attend Oral Hearings dated May 25, 2023 for EP Application No. 16862375.9.
EP Decision to Refuse dated Nov. 13, 2023 for EP Application No. 16862375.9.
EP Minutes of Oral Hearing Nov. 9, 2023 for EP Application No. 16862375.9.
Chinese Office Action dated Nov. 24, 2023 for CN Application No. 202110497675.1.

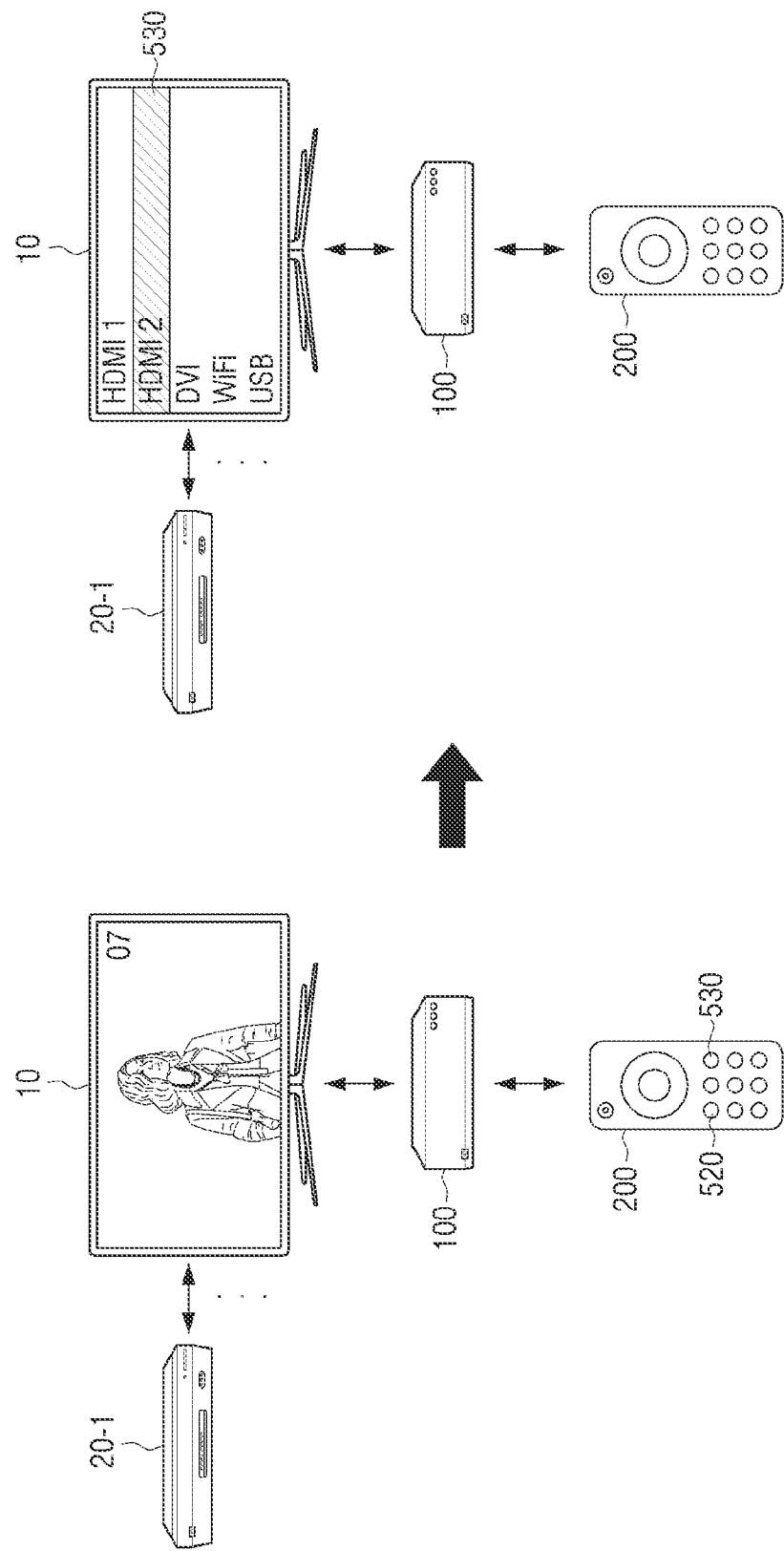

ELECTRONIC APPARATUS, REMOTE CONTROL APPARATUS, CONTROL METHOD THEREOF, AND ELECTRONIC SYSTEM

CROSS-REFERENCE TO RELATED APPLICATION

This application is a Continuation of U.S. application Ser. No. 16/872,408, filed May 12, 2020, which is a Continuation of U.S. application Ser. No. 15/337,116, filed Oct. 28, 2016 (Abandoned), which claims priority to KR 10-2015-0155547, filed Nov. 6, 2015, the entire contents of each of which are all hereby incorporated herein by reference in their entireties.

BACKGROUND

Field

Apparatuses and methods of the disclosure relate generally to an electronic apparatus, a remote control apparatus, a control method thereof, and an electronic system, and for example, to an electronic apparatus, a remote control apparatus, a control method thereof, and an electronic system capable of controlling a plurality of apparatuses.

Description of Related Art

In accordance with the development of electronic technology, a method of connecting various external electronic apparatus providing contents, such as a set-top box, a digital versatile disk (DVD), an audio apparatus, and the like, to a display apparatus has been developed. Remote controllers provided to the respective external electronic apparatuses are generally used in order to control the external electronic apparatuses. However, when the number of external electronic apparatuses is increased, the number of remote controllers is also increased.

Therefore, a universal remote controller that may control a plurality of apparatuses has been developed. However, in order to control electronic apparatuses that are not registered in the universal remote controller, a process of setting control code sets of the electronic apparatuses is required. That is, a user must input the control code sets one by one in order to use the universal remote controller.

In addition, even in the case of using the universal remote controller to which the control code sets are input, an apparatus to be controlled of the plurality of apparatuses should be selected, which is a troublesome process. In the case of using a universal remote controller including a significant number of buttons in order to avoid this troublesome process, a manufacturing cost is increased, and it is difficult for the user to manipulate the buttons.

Therefore, the necessity for a method for decreasing a manufacturing cost of the universal remote controller by providing an appropriate number of buttons in the universal remote controller and more conveniently providing setting and control function of the universal remote controller has increased.

SUMMARY

Example embodiments of the present disclosure address the above disadvantages and other disadvantages not described above.

The present disclosure provides an electronic apparatus, a remote control apparatus, a control method thereof, and an electronic system capable of automatically determining an apparatus from among a plurality of apparatuses to be controlled.

According to an example aspect of the present disclosure, an electronic apparatus includes: a storage storing control code sets corresponding to each of a display apparatus and one or more external electronic apparatuses providing contents to the display apparatus; a communicator comprising communication circuitry configured to communicate with the display apparatus and a remote control apparatus; and a processor configured to determine a source apparatus, providing content that is currently displayed on the display apparatus, of the display apparatus and the one or more external electronic apparatuses, and to control the communication circuitry to transmit a control code set corresponding to the determined source apparatus to the remote control apparatus.

The processor may receive information on the apparatus providing the content that is currently displayed on the display apparatus from the display apparatus, and determine the source apparatus based on the received information.

The communication circuitry of the communicator may perform communication with the one or more external electronic apparatuses, and the processor may transmit a content provided from any one of the one or more external electronic apparatuses to the display apparatus and determine that the external electronic apparatus providing the content is the source apparatus.

When the source apparatus providing the content that is currently displayed on the display apparatus is changed, the processor may transmit a control code set corresponding to the changed source apparatus to the remote control apparatus.

When the source apparatus code is determined, the processor may receive the control code set corresponding to the determined source apparatus from an external server and store the received control code set in the storage.

According to another example aspect of the present disclosure, a remote control apparatus includes: a user interface including a plurality of buttons; a storage storing control code sets corresponding to each of a display apparatus and one or more external electronic apparatuses providing contents to the display apparatus therein; a communicator comprising communication circuitry configured to communicate with a main apparatus, communicating with the display apparatus, of the one or more external electronic apparatuses; and a processor configured to automatically detect a control code set corresponding to a source apparatus providing a content that is currently displayed on the display apparatus and to map the detected control code set to the plurality of buttons, when information on the source apparatus of the display apparatus and the one or more external electronic apparatuses is received from the main apparatus.

In the example in which the control code set corresponding to the source apparatus is not stored in the storage, the processor may transmit a signal requesting the main apparatus to transmit the control code set corresponding to the source apparatus to the main apparatus, map a control code set received from the main apparatus to the plurality of buttons, and store the control code set in the storage.

The remote control apparatus may include a first button configured to receive a user command for mapping a control code set corresponding to the main apparatus to the plurality of buttons.

The remote control apparatus may further include a second button configured to receive a user command for returning to a button mapping state immediately before the first button is pressing-manipulated, after the first button is pressing-manipulated.

According to still another example aspect of the present disclosure, an electronic system includes: an electronic apparatus configured to store control code sets corresponding to each of a display apparatus and one or more external electronic apparatuses providing contents to the display apparatus therein, to determine a source apparatus providing a content that is currently displayed on the display apparatus, and to transmit a control code set corresponding to the determined source apparatus to a remote control apparatus; and the remote control apparatus including a plurality of buttons, and configured to automatically map the control code set to the plurality of buttons when the control code set is received from the electronic apparatus.

According to yet another example aspect of the present disclosure, a method of controlling an electronic apparatus storing control code sets corresponding to each of a display apparatus and one or more external electronic apparatuses providing contents to the display apparatus includes: determining a source apparatus, providing a content that is currently displayed on the display apparatus, of the display apparatus and the one or more external electronic apparatus; and transmitting a control code set corresponding to the determined source apparatus to a remote control apparatus.

In the determining of the source apparatus, information on the apparatus providing the content that is currently displayed on the display apparatus may be received from the display apparatus, and the source apparatus may be determined on the basis of the received information.

The determining of the source apparatus may include: transmitting a content provided from any one of the one or more external electronic apparatuses to the display apparatus; and determining that the external electronic apparatus providing the content is the source apparatus.

In the transmitting of the control code set, when the source apparatus providing the content that is currently displayed on the display apparatus is changed, a control code set corresponding to the changed source apparatus may be transmitted to the remote control apparatus.

The method of controlling an electronic apparatus may further include receiving the control code set corresponding to the determined source apparatus from an external server and storing the received control code set in the storage, when the source apparatus is determined.

According to yet another example aspect of the present disclosure, a method of controlling a remote control apparatus including a plurality of buttons and storing control code sets corresponding to each of a display apparatus and one or more external electronic apparatuses providing contents to the display apparatus therein includes: receiving information on a source apparatus, providing a content that is currently displayed on the display apparatus, of the display apparatus and the one or more external electronic apparatuses, from a main apparatus, communicating with the display apparatus, of the one or more external electronic apparatuses; automatically detecting a control code set corresponding to the source apparatus; and mapping the detected control code set to the plurality of buttons.

The method of controlling a remote control apparatus may further include transmitting a signal requesting a main apparatus to transmit the control code set corresponding to the source apparatus in the example in which the control code set corresponding to the source apparatus is not stored in a storage, wherein in the mapping of the detected control code set, a control code set received from the main apparatus is mapped to the plurality of buttons.

The method of controlling a remote control apparatus may further include: receiving a pressing manipulation input of a first button; and mapping a control code set corresponding to the main apparatus to the plurality of buttons.

The method of controlling a remote control apparatus may further include: receiving a pressing manipulation input of a second button after the first button is pressing-manipulated; and returning to a button mapping state immediately before the first button is pressing-manipulated.

According to the various example embodiments of the present disclosure as described above, an apparatus to be controlled of the plurality of apparatuses may be automatically determined by the electronic apparatus, and the determined apparatus may be controlled by the remote control apparatus.

BRIEF DESCRIPTION OF THE DRAWINGS

The above and/or other aspects of the present disclosure will be more apparent from the following detailed description, taken in conjunction with the accompanying drawings, in which like reference numerals refer to like elements, and wherein:

FIGS. 5A and 5B are diagrams illustrating an example operation in the case of inputting a preset user command using a remote control apparatus;

DETAILED DESCRIPTION

Figure 1:
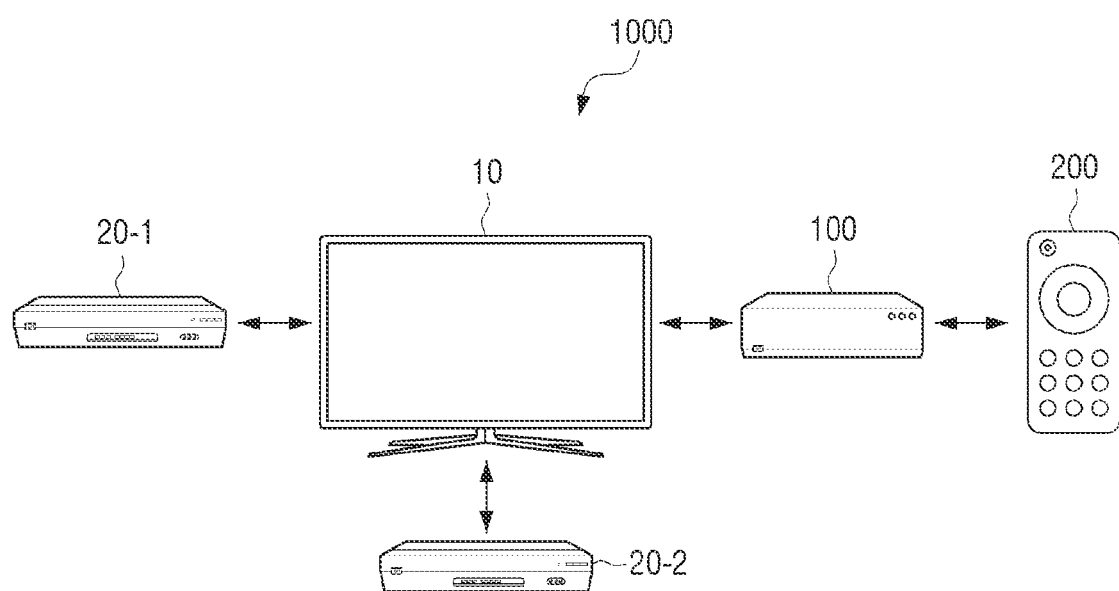
FIG. 1 is a diagram illustrating an example electronic system according to an example embodiment of the present disclosure.

The example embodiments of the present disclosure may be diversely modified. Accordingly, various example embodiments are illustrated in the drawings and are described in greater detail in the detailed description. However, it is to be understood that the present disclosure is not limited to any particular example embodiment, but includes all modifications, equivalents, and substitutions without departing from the scope and spirit of the present disclosure. Also, well-known functions or constructions may not be described in detail if they would obscure the disclosure with unnecessary detail.

Hereinafter, various example embodiments of the present disclosure will be described with reference to the accompanying drawings. It is to be understood that contents mentioned in the present disclosure are not to limit the scope of the present disclosure to any particular example embodiments, but includes various modifications, equivalents, and/or alternatives of example embodiments of the present disclosure. Throughout the accompanying drawings, similar components may be denoted using like or similar reference numerals.

In addition, expressions "first", "second", and the like, used in the present disclosure may be used in order to distinguish various components from each other regardless of a sequence or importance of the respective components. Therefore, a sequence or importance of corresponding components is not limited by these expressions. For example, a first component may be named a second component and the second component may also be similarly named the first component, without departing from the scope of the present disclosure.

In addition, when it is mentioned that any component (for example, a first component) is (operatively or communicatively) coupled or connected to another component (for example, a second component), it is to be understood that any component is directly coupled to another component or is indirectly coupled to another component through the other component (for example, a third component). On the other hand, when it is mentioned that any component (for example, a first component) is "directly coupled" or "directly connected" to another component (for example, a second component), it is to be understood that the other component (for example, a third component) is not present between any component and another component.

Terms used in the present disclosure will be used in order to describe various example embodiments rather than restricting the scope of other example embodiments. In addition, in the present disclosure, singular forms may be used for convenience of explanation. However, these singular forms are intended to include plural forms unless the context clearly indicates otherwise. Further, terms used in the description may have the same meanings as those generally understood by those skilled in the art. Terms defined in a general dictionary among terms used in the present disclosure may be interpreted as having meanings that are the same as or similar to meanings within a context of the related art, and are not interpreted as ideal or excessively formal meanings unless clearly defined in the present disclosure. In some cases, terms may not be interpreted to exclude example embodiments of the present disclosure even though they are defined in the present disclosure.

Hereinafter, various example embodiments of the present disclosure will be described in greater detail with reference to the accompanying drawings.

FIG. 1 is a diagram illustrating an example electronic system 1000 according to an example embodiment of the present disclosure. As illustrated in FIG. 1, the electronic system 1000 includes an electronic apparatus 100, a remote control apparatus 200, a display apparatus 10, and external electronic apparatuses 20-1 and 20-2.

The electronic apparatus 100 may be implemented by various types of apparatuses providing a content to the display apparatus 10 such as, for example, and without limitation, a set-top box, or the like. For example, the electronic apparatus 100 may be implemented by a mounting type apparatus.

The electronic apparatus 100 may perform communication with the display apparatus 10. The electronic apparatus 100 may provide a content to the display apparatus 10. For example, the electronic apparatus 100 may request the display apparatus 10 to transmit information on a source apparatus providing a content, and receive the information on the source apparatus from the display apparatus 10.

The electronic apparatus 100 may perform communication with the remote control apparatus 200. The electronic apparatus 100 may transmit information on the source apparatus to the remote control apparatus 200. The electronic apparatus 100 may also receive a control command for controlling the electronic apparatus 100 from the remote control apparatus 200.

In addition, the electronic apparatus 100 may also perform communication with the external electronic apparatuses 20-1 and 20-2.

The electronic apparatus 100 may determine the source apparatus providing the content that is currently displayed on the display apparatus 10. For example, the electronic apparatus 100 may determine that any one of the external electronic apparatuses 20-1 and 20-2 is the source apparatus. The electronic apparatus 100 may also determine that one of the electronic apparatus 100 and the display apparatus 10 is the source apparatus.

In the example in which the content provided to the display apparatus 10 by the electronic apparatus 100 is displayed, the electronic apparatus 100 may determine that the electronic apparatus 100 is the source apparatus. In the example in which the display apparatus 10 display a content through a broadcasting base station, or the like, the electronic apparatus 100 may determine that the display apparatus 10 is the source apparatus.

The electronic apparatus 100 may transmit a control code set corresponding to the source apparatus to the remote control apparatus 200. The control code set may be stored in the electronic apparatus 100 or be received from an external server to the electronic apparatus 100.

The remote control apparatus 200 may be implemented by various types of apparatuses that may transmit control commands. For example, the remote control apparatus 200 may be a dedicated remote controller of the electronic apparatus 100, a universal remote controller, a smart phone, or the like, but is not limited thereto.

For example, the remote control apparatus 200 may be an apparatus that may control various kinds of apparatuses. In addition, the remote control apparatus 200 may be an apparatus that may interwork with the electronic apparatus 100.

The remote control apparatus 200 may wirelessly transmit the control commands to the electronic apparatus 100, the display apparatus 10, and the external electronic apparatuses 20-1 and 20-2. The remote control apparatus 200 may generate and transmit control commands to correspond to apparatuses to be controlled.

The remote control apparatus 200 may include, for example, and without limitation, a direction key button, a touch pad, and the like. The remote control apparatus 200 may generate various control commands using the direction key button, the touch pad, and other buttons.

The remote control apparatus 200 may receive the information on the source apparatus providing the content that is currently displayed on the display apparatus 10 from the electronic apparatus 100. For example, the remote control apparatus 200 may receive the control code set corresponding to the source apparatus.

The remote control apparatus 200 may store control code sets corresponding to each of the display apparatus 10 and the external electronic apparatuses 20-1 and 20-2 providing contents to the display apparatus 10 therein.

In this example, the remote control apparatus 200 may also receive only the information on the source apparatus providing the content that is currently displayed on the display apparatus 10 from the electronic apparatus 100. In addition, the remote control apparatus 200 may automatically detect the control code set corresponding to the source apparatus. The information on the source apparatus may include a product name, a serial number, a manufacturer, and the like.

Also in the example in which the remote control apparatus 200 stores the control code sets therein, the remote control apparatus 200 may also receive the control code set corresponding to the source apparatus from the electronic apparatus 100. In this example, the remote control apparatus 200 may use the control code set received from the electronic apparatus 100.

The remote control apparatus 200 may map the control code set corresponding to the source apparatus to a plurality of buttons provided by the remote control apparatus. When a user manipulates at least one of the plurality of buttons, the remote control apparatus 200 may transmit a control command for controlling the source apparatus based on the mapped control code set.

The display apparatus 10 may be implemented by various types of apparatuses having a display function, such as, for example, and without limitation, a monitor, a television (TV), a kiosk, and the like. For example, the display apparatus 10 may be implemented by a mounting type apparatus.

The display apparatus 10 may perform communication with the electronic apparatus 100, the external electronic apparatuses 20-1 and 20-2, the remote control apparatus 200, and the like. The display apparatus 10 may receive a signal requesting the display apparatus 10 to transmit the information on the source apparatus providing the content from the electronic apparatus 100, and transmit the corresponding information to the electronic apparatus 100.

The display apparatus 10 may receive the control command from the remote control apparatus 200, and perform an operation corresponding to the control command.

The display apparatus 10 may directly receive contents from a broadcasting base station, and the like, and display the received contents. The display apparatus 10 may also receive contents from at least one of the electronic apparatus 100 and the external electronic apparatuses 20-1 and 20-2. The display apparatus 10 may display at least one of the received contents.

The display apparatus 10 may determine the source apparatus providing the content that is currently displayed. For example, the display apparatus 10 may receive contents from each of a digital versatile disk (DVD) apparatus and a desktop computer. The display apparatus 10 may display one of a plurality of contents under a control of the user, and determine the source apparatus providing the displayed content.

The external electronic apparatuses 20-1 and 20-2 may be broadcasting receiving apparatuses such as set-top boxes, or the like. The external electronic apparatuses 20-1 and 20-2 may be DVD players, or the like, and are not limited as long as they may provide contents to the display apparatus 10.

The external electronic apparatuses 20-1 and 20-2 may be directly connected to the display apparatus 10 to provide the contents to the display apparatus 10. The external electronic apparatuses 20-1 and 20-2 may also provide the contents to the display apparatus 10 through the electronic apparatus 100.

In this example, the electronic apparatus 100 may provide only a content that will be displayed on the display apparatus 10 to the display apparatus 10. Therefore, the electronic apparatus 100 may directly determine the source apparatus providing the content that is currently displayed on the display apparatus 10.

The electronic apparatus 100 may transmit a plurality of contents provided from the external electronic apparatuses 20-1 and 20-2 to the display apparatus 10. In addition, the display apparatus 10 may also display only any one of the plurality of contents. In this example, the electronic apparatus 100 requests the display apparatus 10 to transmit information on a source apparatus providing the content that is currently displayed.

Through the method as described above, the electronic apparatus 100 determines the source apparatus providing the content that is currently displayed on the display apparatus 10, and transmits the information on the source apparatus to the remote control apparatus 200. The remote control apparatus 200 may receive the information on the source apparatus to control the source apparatus without performing a manipulation selecting any one of a plurality of apparatuses.

Figure 2A:
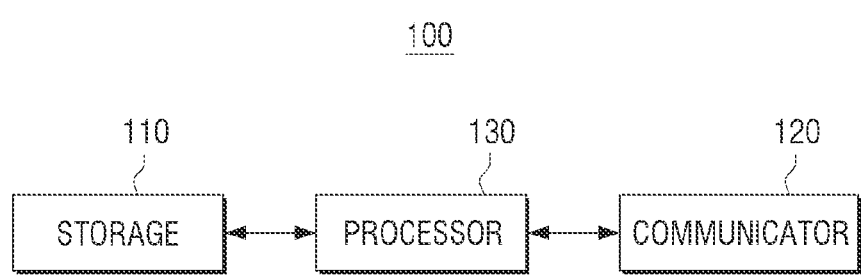
FIG. 2A is a block diagram illustrating example components of an example electronic apparatus according to an example embodiment of the present disclosure.

FIG. 2A is a block diagram illustrating example components of an electronic apparatus 100 according to an example embodiment of the present disclosure.

As illustrated in FIG. 2A, the electronic apparatus 100 includes a storage 110, a communicator (e.g., including communication circuitry) 120, and a processor (e.g., including processing circuitry) 130.

The storage 110 stores various data such as an operating system (O/S) software module for driving the electronic apparatus 100, and the like, therein.

In addition, the storage 110 stores control code sets corresponding to each of the display apparatus and one or more external electronic apparatuses providing a content to the display apparatus therein. For example, the control code set may refer, for example, to a set of information on each button of the remote control apparatus 200 and signal information (for example, waveforms) generated when each button is selected.

The communicator 120 uses various communication circuitry to perform communication with the display apparatus and the remote control apparatus. In addition, the communicator 120 may also perform communication with the one or more external electronic apparatuses to receive a content.

For example, the communicator 120 may use various communication circuitry to transmit the control code set corresponding to the source apparatus providing the content that is currently displayed on the display apparatus to the remote control apparatus 200.

For example, the communication circuitry of the communicator 120 may perform communication with the display apparatus, the one or more external electronic apparatuses, and the remote control apparatus 200 through various communication schemes such as a Bluetooth (BT) scheme, a Bluetooth low energy (BLE) scheme, a wireless fidelity (WIFI) scheme, a Zigbee scheme, an infrared (IR) scheme, a serial interface scheme, a universal serial bus (USB) scheme, a near field communication (NFC) scheme, and the like. Among them, an NFC chip may refer, for example, to a chip including circuitry operated in the NFC scheme using a band of 13.56 MHz among various radio frequency identification (RFID) frequency bands such as 135 kHz, 13.56 MHz, 433 MHz, 860 to 960 MHz, 2.45 GHz, and the like. In an example of using a WiFi chip or a Bluetooth chip, various connection information such as a service set identifier (SSID), a session key, and the like, is first transmitted and received, communication is connected using the connection information, and various information may then be transmitted and received. A wireless communication chip may refer, for example, to a chip including circuitry performing communication depending on various communication protocols such as Institute of Electrical and Electronics Engineers (IEEE), Zigbee, 3rd generation (3G), 3rd generation partnership project (3GPP), long term evolution (LTE), and the like.

Although an example in which the communicator 120 is implemented as one component has been described hereinabove, a first communicator (not illustrated) including circuitry for performing communication with the display apparatus and the one or more external electronic apparatuses and a second communicator (not illustrated) including circuitry for performing communication with the remote control apparatus 200 may also be separately implemented in other example embodiments. In addition, communication schemes of the first communicator and the second communicator may be the same as or similar to each other or be different from each other.

The processor 130 generally controls an operation of the electronic apparatus 100.

The processor 130 may decide whether or not a content that is currently displayed on the display apparatus is present. When it is decided that the content that is currently displayed on the display apparatus is not present, the processor 130 may transmit information on the electronic apparatus 100 to the remote control apparatus 200. In this example, the remote control apparatus 200 controls the electronic apparatus 100.

When it is decided that the content that is currently displayed on the display apparatus is present, the processor 130 may determine a source apparatus, providing the content that is currently displayed on the display apparatus, of the display apparatus and the one or more external electronic apparatuses. For example, the processor 130 may determine the source apparatus by receiving information on the source apparatus providing the content that is currently displayed on the display apparatus from the display apparatus.

In an example in which the electronic apparatus 100 performs communication with the one or more external electronic apparatuses, the processor 130 may transmit a content provided from any one of the one or more external electronic apparatuses to the display apparatus, and may determine that the external electronic apparatus providing the content is a source apparatus.

In an example in which the electronic apparatus 100 transmits a plurality of contents provided from each of the one or more external electronic apparatuses to the display apparatus, the processor 130 may request the display apparatus to transmit information on the source apparatus providing the content that is currently displayed.

The processor 130 may receive the information on the source apparatus providing the content that is currently displayed on the display apparatus from the display apparatus, and determine the source apparatus on the basis of the received information.

The processor 130 may transmit a control code set corresponding to the determined source apparatus to the remote control apparatus 200. The processor 130 may also transmit only information on the determined source apparatus to the remote control apparatus 200.

The electronic apparatus 100 may store information on whether or not the remote control apparatus 200 stores a plurality of control code sets therein, and the processor 130 may determine information that will be transmitted to the remote control apparatus 200 based on the stored information.

For example, in the example in which the remote control apparatus 200 stores the plurality of control code sets therein, the processor 130 may transmit only the information on the determined source apparatus to the remote control apparatus 200. In the example in which the remote control apparatus 200 does not store the plurality of control code sets therein, the processor 130 may transmit the control code set corresponding to the determined source apparatus to the remote control apparatus 200.

When the source apparatus providing the content that is currently displayed on the display apparatus is changed, the processor 130 may transmit a control code set corresponding to the changed source apparatus to the remote control apparatus 200. For example, when a DVD content provided from the DVD apparatus to the display apparatus and displayed on the display apparatus is changed to a broadcasting content provided from the set-top box to the display apparatus, the processor 130 may transmit a control code set corresponding to the set-top box to the remote control apparatus. The processor 130 may also transmit information on the set-top box to the remote control apparatus.

However, it will be understood that the present disclosure is not limited thereto, and the processor 130 may also determine the source apparatus providing the content that is currently displayed on the display apparatus at a preset time interval, and transmit information on the determined source apparatus or a control code set corresponding to the determined source apparatus to the remote control apparatus.

In an example in which a specific event occurs, the processor 130 may also perform an operation of determining the source apparatus providing the content that is currently displayed on the display apparatus. For example, in the example in which a control command for any apparatus is transmitted from the remote control apparatus 200, the processor 130 may also perform an operation of sensing the control command and determining the source apparatus.

The processor 130 may receive the control code sets corresponding to each of the display apparatus and the one or more external electronic apparatuses from an external server, and store the received control code sets in the storage 110. The processor 130 may also receive the control code sets corresponding to each of the display apparatus and the one or more external electronic apparatuses from each of the display apparatus and the one or more external electronic apparatuses, and store the received control code sets in the storage 110.

When the source apparatus is determined, the processor 130 may receive a control code set corresponding to the determined source apparatus from the external server and store the received control code set in the storage 110. The processor 130 may also receive a control code set corresponding to the source apparatus from the external server at a preset time interval. In the example in which the new apparatus is added to the same network, the processor 130 may also receive a control code set corresponding to a new apparatus from the external server.

Figure 2B:
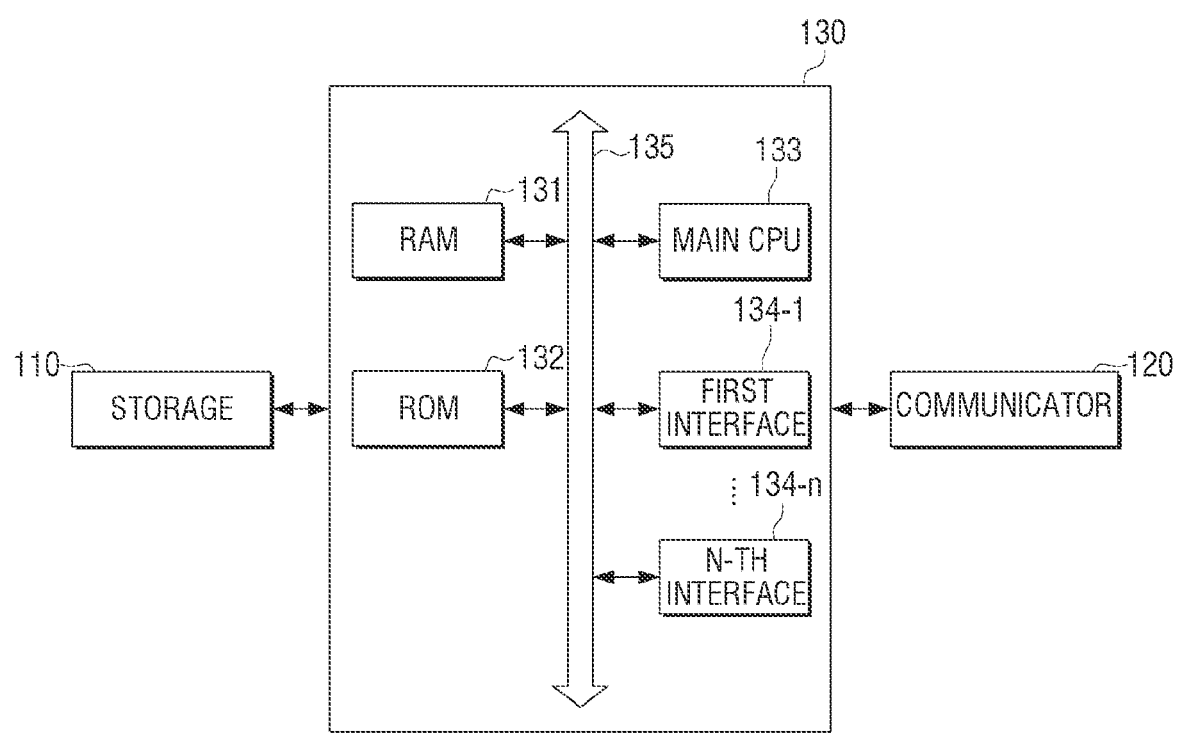
FIG. 2B is a block diagram illustrating example components of the electronic apparatus illustrated in FIG. 2A.

FIG. 2B is a block diagram illustrating example components of the electronic apparatus illustrated in FIG. 2A. A detailed description for components overlapped with components illustrated in FIG. 2A among components illustrated in FIG. 2B will be omitted.

The processor 130 includes a random access memory (RAM) 131, a read only memory (ROM) 132, a main central processing unit (CPU) 133, first to n-th interfaces 134-1 to 134-*n*, and a bus 135.

The RAM 131, the ROM 132, the main CPU 133, the first to n-th interfaces 134-1 to 134-*n*, and the like, may be connected to one another through the bus 135.

The first to n-th interfaces 134-1 to 134-*n* are connected to the various components described above. One of the interfaces may also be a network interface connected to the display apparatus or the one or more external electronic apparatuses through a network.

The main CPU 133 accesses the storage 110 to perform booting using an O/S stored in the storage 110. In addition, the main CPU 110 performs various operations using various programs, contents, data, and the like, stored in the storage 160.

An instruction set for booting a system, or the like, is stored in the ROM 132. When a turn-on command is input to supply power to the main CPU 133, the main CPU 133 may copy the O/S stored in the storage 110 to the RAM 132 depending on an instruction stored in the ROM 131, and execute the O/S to boot the system. When the booting is completed, the main CPU 133 copies various programs stored in the storage 110 to the RAM 131, and executes the programs copied to the RAM 131 to perform various operations.

As described above, the storage 110 stores various data such as the O/S software module for driving the electronic apparatus 100 and various contents therein.

Figure 3:
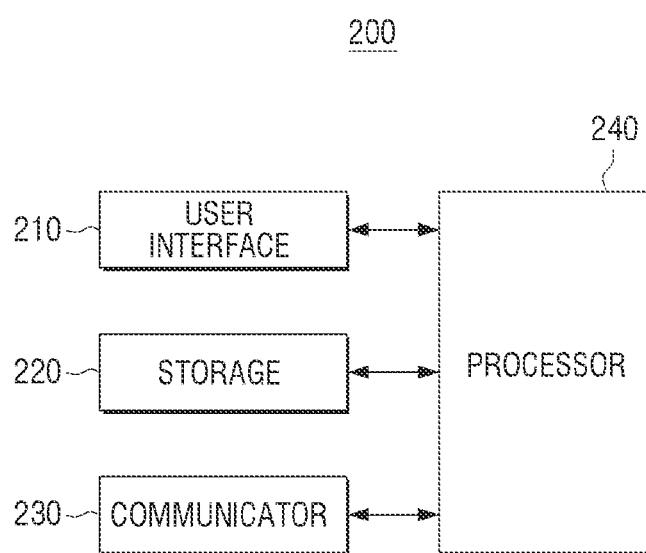
FIG. 3 is a block diagram illustrating example components of a remote control apparatus according to an example embodiment of the present disclosure.

FIG. 3 is a block diagram illustrating example components of a remote control apparatus 200 according to an example embodiment of the present disclosure.

As illustrated in FIG. 3, the remote control apparatus 200 includes a user interface 210, a storage 220, a communicator (e.g., including communication circuitry) 230, and a processor 240.

The user interface 210 may include various interface circuitry, such as, for example, and without limitation, a plurality of buttons, and receive various user interactions.

For example, the user interface 210 may include circuitry such as a plurality of physical buttons or a plurality of soft buttons. In addition, the user interface 210 may include circuitry including a joystick, a touch pad, or the like.

In the example in which the user interface 210 is implemented by the plurality of soft buttons, the remote control apparatus 200 may be implemented by a touch-based terminal, and the user interface 210 may also be implemented in a touch screen form forming a layer structure together with a touch pad. In addition, the user interface 210 may be used as a display.

The storage 220 stores various data such as an O/S software module for driving the remote control apparatus 200, and the like, therein.

The storage 220 stores control code sets corresponding to each of the display apparatus and the one or more external electronic apparatuses providing the content to the display apparatus therein. For example, the storage 220 stores a control code set corresponding to a main apparatus, communicating with the display apparatus, of the one or more external electronic apparatuses, therein.

The storage 220 may also store only any one of the plurality of control code sets described above therein. For example, the storage 220 may also store only a control code set corresponding to a source apparatus providing a content that is currently displayed on the display apparatus therein.

The storage 220 may store the control code set corresponding to the source apparatus and a control code set corresponding to a preset electronic apparatus therein. The preset electronic apparatus will be described below.

The communicator 230 may include various communication circuitry that performs communication with the display apparatus, the electronic apparatus 100, and the one or more external electronic apparatuses.

For example, the communicator 230 may include circuitry configured to perform communication with the electronic apparatus 100 to receive information on the source apparatus currently providing the content to the display apparatus. The communication circuitry of the communicator 230 may transmit a control command generated based on the information on the source apparatus to the source apparatus.

For example, the communication circuitry of the communicator 230 may perform communication with the display apparatus, the electronic apparatus 100, and the one or more external electronic apparatuses through various communication schemes such as a Bluetooth (BT) scheme, a Bluetooth low energy (BLE) scheme, a wireless fidelity (WIFI) scheme, a Zigbee scheme, an infrared (IR) scheme, a serial interface scheme, a universal serial bus (USB) scheme, a near field communication (NFC) scheme, and the like.

Although an example in which the communicator 230 is one component has been described hereinabove, a first communicator (not illustrated) performing communication with the electronic apparatus 100 and a second communicator (not illustrated) performing communication with the display apparatus and the one or more external electronic apparatuses may also be separately implemented in other example embodiments. In addition, communication schemes of the first communicator and the second communicator may be the same as or similar to each other or be different from each other.

The processor 240 generally controls an operation of the remote control apparatus 200.

When the information on the source apparatus, providing the content that is currently displayed on the display apparatus, of the display apparatus and the one or more external electronic apparatuses is received from the main apparatus, the processor 240 may automatically detect a control code set corresponding to the source apparatus. In this example, the processor 240 may detect the control code set, corresponding to the source apparatus, of the control code sets stored in the storage 220. The information on the source apparatus may include, for example, a product name, a serial number, a manufacturer, and the like, of the source apparatus. For example, the main apparatus may be an apparatus, performing communication with the display apparatus and directly performing communication with the remote control apparatus 200, of the one or more external electronic apparatuses.

The processor 240 may also receive the control code set corresponding to the source apparatus providing the content that is currently displayed on the display apparatus from the main apparatus. In this case, the processor 240 may not perform an operation of detecting the control code set.

The processor 240 may map the detected control code set to a plurality of buttons. For example, in the example in which a control code set corresponding to the DVD apparatus is mapped to the plurality of buttons, the remote control apparatus 200 may control the DVD apparatus.

The processor 240 may also directly control one of the display apparatus and the one or more external electronic apparatuses depending on a kind of control code sets.

In the example in which the control code set corresponding to the source apparatus is not stored in the storage 220, the processor 240 may transmit a signal requesting the main apparatus to transmit the control code set corresponding to the source apparatus to the main apparatus, map the control code set received from the main apparatus to the plurality of buttons, and store the control code set in the storage 220.

The remote control apparatus 200 may include a first button receiving a user command for mapping the control code set corresponding to the main apparatus to the plurality of buttons.

For example, when a pressing manipulation of the first button is input in a state in which the control code set corresponding to the DVD apparatus is mapped to the plurality of buttons, the processor 240 may map the control code set corresponding to the main apparatus to the plurality of buttons. That is, the user may press the first button to change the control code set of the remote control apparatus 200 so as to control the main apparatus.

The control code set corresponding to the main apparatus may be stored in the storage 220, and may be stored separately from control code sets corresponding to other apparatuses.

The control code set corresponding to the main apparatus may also be received from the main apparatus. For example, when the pressing manipulation of the first button is input, the processor 240 may transmit a signal requesting the main apparatus to transmit the control code set corresponding to the main apparatus to the main apparatus. The remote control apparatus 200 may receive the control code set corresponding to the main apparatus from the main apparatus, and map the received control code set to the plurality of buttons.

The remote control apparatus 200 may further include a second button receiving a user command for returning to a button mapping state immediately before the first button is pressing-manipulated, after the first button is pressing-manipulated.

When a pressing manipulation of the second button is input in a state in which the control code set corresponding to the main apparatus is mapped to the plurality of buttons as in the example described above, the processor 240 may again map the control code set corresponding to the DVD apparatus to the plurality of buttons.

A control code set of the main apparatus immediately before being mapped may be stored in the storage 220.

The control code set of the main apparatus immediately before being mapped may also be received from the main apparatus. For example, when the pressing manipulation of the second button is input, the processor 240 may transmit a signal requesting the main apparatus to transmit the control code set of the main apparatus immediately before being mapped to the main apparatus. The remote control apparatus 200 may receive the control code set of the main apparatus immediately before being mapped from the main apparatus, and map the received control code set to the plurality of buttons.

Although an example in which the first button and the second button are different buttons has been described hereinabove, the first button and the second button may be the same button.

In addition, although an example in which the main apparatus is controlled through the input of the first button has been described, the present disclosure is not limited thereto. For example, the display apparatus or other electronic apparatuses may also be controlled through the input of the first button. Mapping between the input of the first button and an apparatus to be controlled may also be set by the user.

The processor 240 may receive the control code sets corresponding to each of the display apparatus and the one or more external electronic apparatuses from the electronic apparatus 100, and store the received control code sets in the storage 220. The processor 240 may also receive control code sets corresponding to a plurality of apparatuses from the external server, and store the received control code sets in the storage 220.

The processor 240 may generate a control command for controlling the source apparatus depending on a user command, and transmit the generated control command.

Figure 4A:
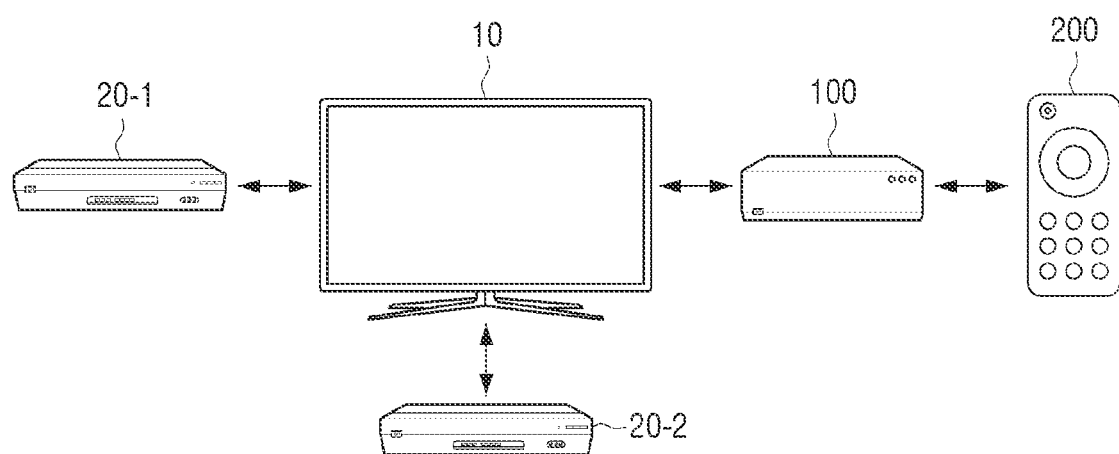
FIG. 4A is a diagram illustrating example components of an electronic system according to an example embodiment of the present disclosure.

FIG. 4A is a diagram illustrating example components of an electronic system according to an example embodiment of the present disclosure.

As illustrated in FIG. 4A, the display apparatus 10 may be connected to the one or more external electronic apparatuses 20-1 and 20-2 as well as the electronic apparatus 100.

The display apparatus 10 may receive contents from the electronic apparatus 100 and the one or more external electronic apparatuses 20-1 and 20-2. For example, even in the example in which all of a plurality of apparatuses are operated to provide the respective contents to the display apparatus 10, the display apparatus 10 may display only any one of the plurality of contents that are received.

The electronic apparatus 100 may receive the information on the source apparatus providing the content that is currently displayed from the display apparatus 10. The electronic apparatus 100 may request the display apparatus 10 to transmit the information on the source apparatus, and receive the information on the source apparatus from the display apparatus 10. The display apparatus 10 may also transmit the information on the source apparatus to the electronic apparatus 100 at a preset time interval.

The electronic apparatus 100 may transmit the information on the source apparatus or the control code set for the source apparatus to the remote control apparatus 200, and the remote control apparatus 200 may map the control code set corresponding to the source apparatus to a plurality of buttons to control the source apparatus.

Figure 4B:
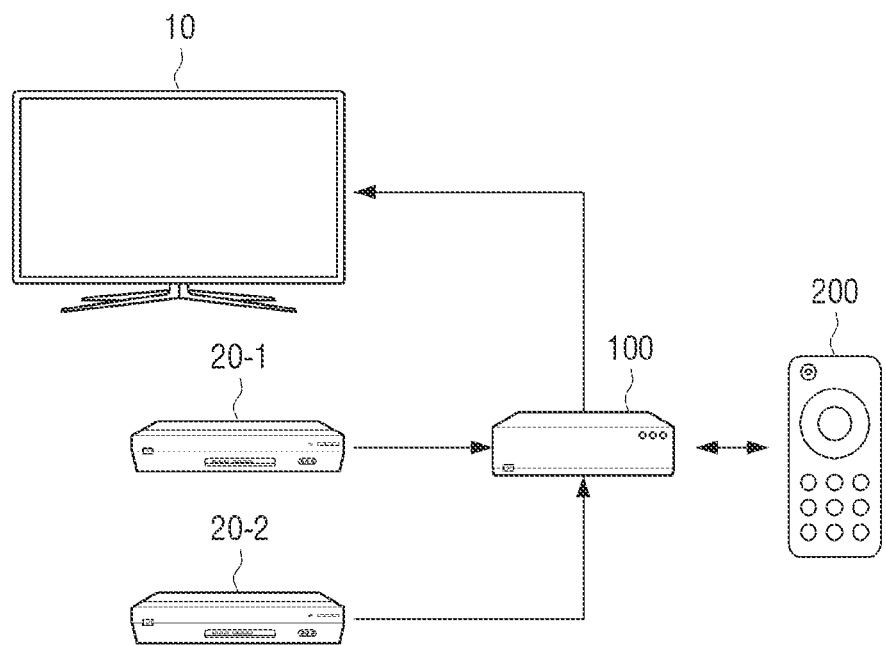
FIG. 4B is a diagram illustrating example components of an electronic system according to another example embodiment of the present disclosure.

FIG. 4B is a diagram illustrating example components of an example electronic system according to another example embodiment of the present disclosure.

As illustrated in FIG. 4B, the display apparatus 10 may be connected to the electronic apparatus 100. The electronic apparatus 100 may be connected to the one or more external electronic apparatuses 20-1 and 20-2.

The electronic apparatus 100 may receive contents from the one or more external electronic apparatuses 20-1 and 20-2. For example, even in the example in which both of the one or more external electronic apparatuses 20-1 and 20-2 are operated to provide the respective contents to the electronic apparatus 100, the electronic apparatus 100 may provide only any one of the plurality of contents that are received to the display apparatus 10.

In this example, the electronic apparatus 100 may also transmit information on a source apparatus to the remote control apparatus 200 without receiving the information on the source apparatus from the display apparatus 10. The electronic apparatus 100 may determine the source apparatus by deciding, for example, at which input port a content, provided to the display apparatus 10 through an output port, of a plurality of contents input to input ports is received.

The electronic apparatus 100 may also provide all of the plurality of contents that are received to the display apparatus 10. In this example, the electronic apparatus 100 may receive the information on the source apparatus from the display apparatus 10 and transmit the information on the source apparatus to the remote control apparatus 200, as illustrated in FIG. 4A.

The electronic apparatus 100 may also provide a content directly received from the external server, or the like, to the display apparatus 10.

Hereinabove, an example in which the remote control apparatus 200 directly controls the source apparatus has been described. For example, the remote control apparatus 200 may include an infrared (IR) transmitter, and may transmit an infrared signal to the source apparatus to directly control the source apparatus.

However, the present disclosure is not limited thereto, and the remote control apparatus 200 may also transmit a control command to the electronic apparatus 100 in the case in which the electronic system is configured as illustrated in FIG. 4B. The electronic apparatus 100 may also transmit the received control command to the source apparatus to control the source apparatus.

Although only two external electronic apparatuses 20-1 and 20-2 are illustrated in FIGS. 4A and 4B, the present disclosure is not limited thereto. For example, external electronic apparatuses may also be connected to the display apparatus 10 by the number of external electronic apparatuses that may be connected to the display apparatus 10 in terms of hardware. External electronic apparatuses may also be connected to the electronic apparatus 100 by the number of external electronic apparatuses that may be connected to the electronic apparatus 100 in terms of hardware.

Figure 5A:
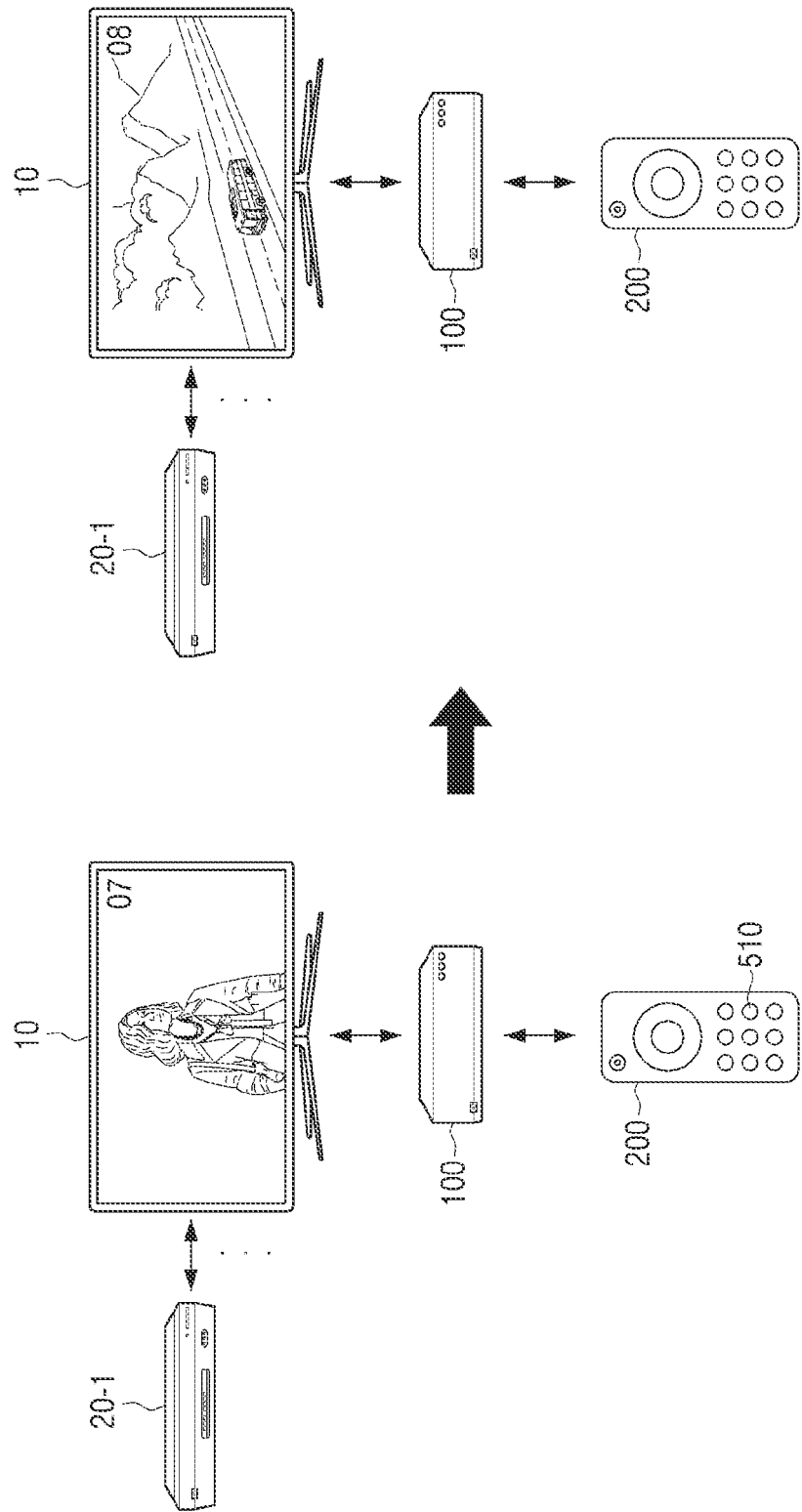

FIGS. 5A and 5B are diagrams illustrating an example operation in the case of inputting a preset user command using a remote control apparatus 200. The remote control apparatus 200 may include general buttons and special buttons. The general buttons are buttons for controlling the source apparatus, and the special buttons are button for controlling a preset apparatus.

The general buttons may be used after the remote control apparatus receives the information on the source apparatus and maps a control code set to the plurality of buttons, and generate different control commands depending on a kind of the control code set.

The special buttons are buttons that are irrelevant to the control code set corresponding to the source apparatus. For example, even though the control code set mapped to the plurality of buttons is changed due to a change of the source apparatus from the DVD apparatus to the set-top box, a new control code set is not mapped to the special buttons.

As illustrated in FIG. 5A, the display apparatus 10 may receive a content from any one source apparatus and display the received content. For example, when a general button 510 of the remote control apparatus 200 is manipulated, the remote control apparatus 200 transmits a control command corresponding to the source apparatus. For example, although a plurality of apparatuses may receive the control command, only the source apparatus may be operated depending on the control command.

When the control command of the remote control apparatus 200 is transmitted to the source apparatus, a channel may be changed from Channel No. 7 to Channel No. 8, as illustrated in, for example, FIG. 5A. However, this is only an example, and different operations may also be performed depending on general buttons manipulated in the source apparatus and the remote control apparatuses 200.

For example, in the example of using the general button 510, different operations may be performed depending on a kind of the source apparatus and a kind of the general button 510.

As illustrated in FIG. 5B, when a first special button 520 is manipulated, a function provided by a preset apparatus may be displayed. For example, the preset apparatus may be the electronic apparatus 100, and the electronic apparatus 100 may control the display apparatus 10 to display a screen for determining a content that will be displayed on the display apparatus 10 depending on an input of the first special button 520. Therefore, the display apparatus 10 may display a screen for determining a content that will be displayed by focusing on a connecting method of the source apparatus providing the content, before the first special button 520 is manipulated.

In addition, when the first special button 520 is manipulated, the remote control apparatus 200 may map a control code set corresponding to the preset apparatus to the plurality of buttons. The control code set corresponding to the preset apparatus may be stored in the storage 220. When the first special button 520 is manipulated, the remote control apparatus 200 may also transmit a signal requesting the electronic apparatus 100 to transmit the control code set corresponding to the preset apparatus to the electronic apparatus 100. Therefore, after the first special button 520 is manipulated, the source apparatus is not controlled, and only the preset apparatus may be controlled.

When a second special button 530 is operated in this state, the display apparatus 10 may return, for example, to a state before the function provided by the preset apparatus is displayed. For example, the preset apparatus may be the electronic apparatus 100, and the electronic apparatus 100 may control the display apparatus 10 to display a content that was displayed before the first special button 520 is input, depending on an input of the second special button 530.

In addition, when the second special button 530 is manipulated, the remote control apparatus 200 may map a control code set corresponding to the source apparatus before the control code set corresponding to the preset apparatus is mapped to the plurality of buttons. The control code set corresponding to the source apparatus before the first special button 520 is manipulated may be stored in the storage 220. When the second special button 530 is manipulated, the remote control apparatus 200 may transmit a signal requesting the electronic apparatus 100 to transmit the control code set corresponding to the source apparatus before the first special button 520 is manipulated to the electronic apparatus 100.

Although an example in which the first special button 520 and the second special button 530 are separate buttons has been illustrated in FIGS. 5A and 5B, the present disclosure is not limited thereto. For example, the first special button 520 and the second special button 530 may also be the same button.

The remote control apparatus 200 may also not separately include the special button. For example, in the case in which a plurality of general buttons of the remote control apparatus 200 are simultaneously manipulated, the same operation as that of the special button described above may also be configured to be performed.

Although an example in which the electronic apparatus 100 is the preset apparatus has been described in FIG. 5B, the present disclosure is not limited thereto. For example, the preset apparatus may also be the display apparatus 10 or the external electronic apparatus 20-1. The preset apparatus may be set by the user.

In addition, although an example in which a display screen is changed depending on the manipulation of the special button has been described in FIG. 5B, the present disclosure is not limited thereto. For example, in the example in which the special button is manipulated, only the control code set corresponding to the preset source apparatus may be mapped to the plurality of buttons, and the display screen my not be changed.

Figure 6A:
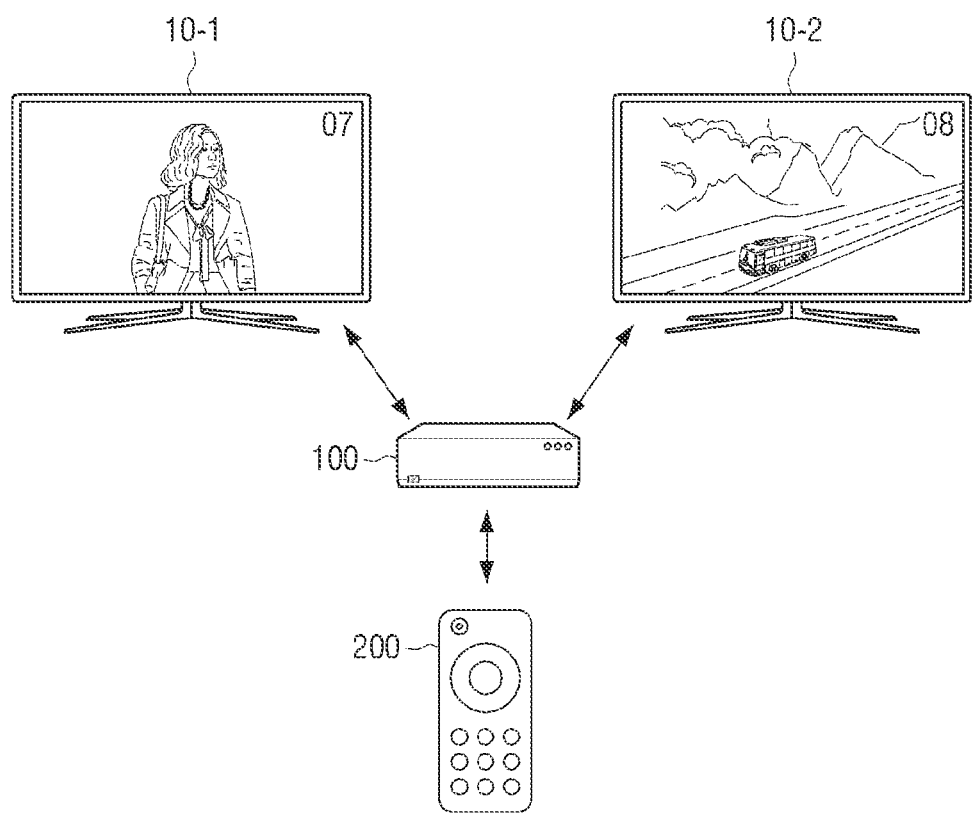
FIGS. 6A and 6B are diagrams illustrating an example of a case in which the number of contents that are currently displayed is plural.
Figure 6B:
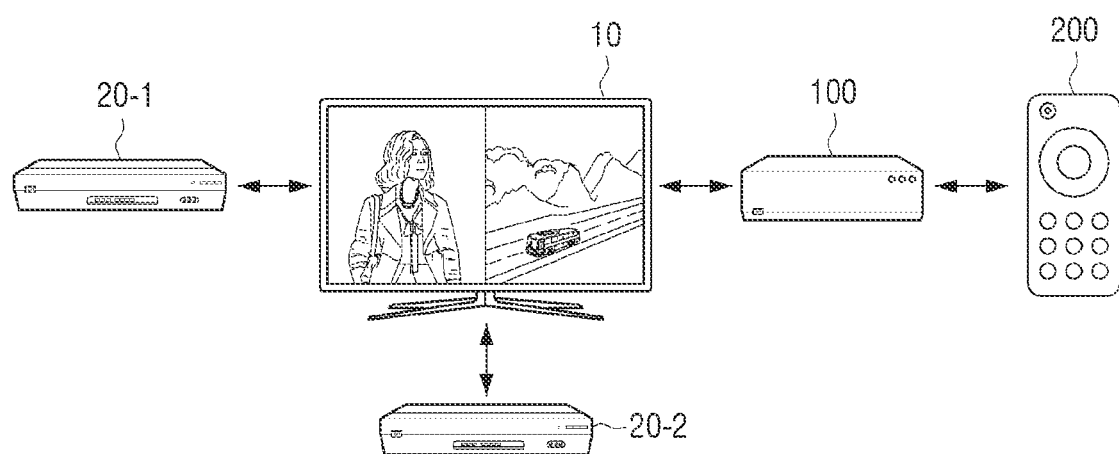

FIGS. 6A and 6B are diagrams illustrating an example of a case in which the number of contents that are currently displayed is plural.

As illustrated in FIG. 6A, the electronic system may include a plurality of display apparatuses 10-1 and 10-2. For example, the plurality of display apparatuses 10-1 and 10-2 may receive contents from different source apparatuses, respectively, to display different images.

The electronic apparatus 100 may provide information on a source apparatus providing a content to a display apparatus, having a higher priority, of the plurality of display apparatuses 10-1 and 10-2, to the remote control apparatus 200.

Priorities may be preset by the user. The priorities may also be determined depending on times in which the display apparatuses are turned on. The priorities may also be determined on the basis of distances between the display apparatuses and the remote control apparatus 200.

As illustrated in FIG. 6B, a display apparatus 10 may also receive contents from a plurality of source apparatuses to display a plurality of contents.

In this example, the electronic apparatus 100 may provide information on a source apparatus, having a higher priority, of a plurality of source apparatuses, to the remote control apparatus 200.

Priorities may be preset by the user. Alternatively, the priorities may also be determined depending on times in which the source apparatuses provide the contents to the display apparatus 10.

Figure 7:
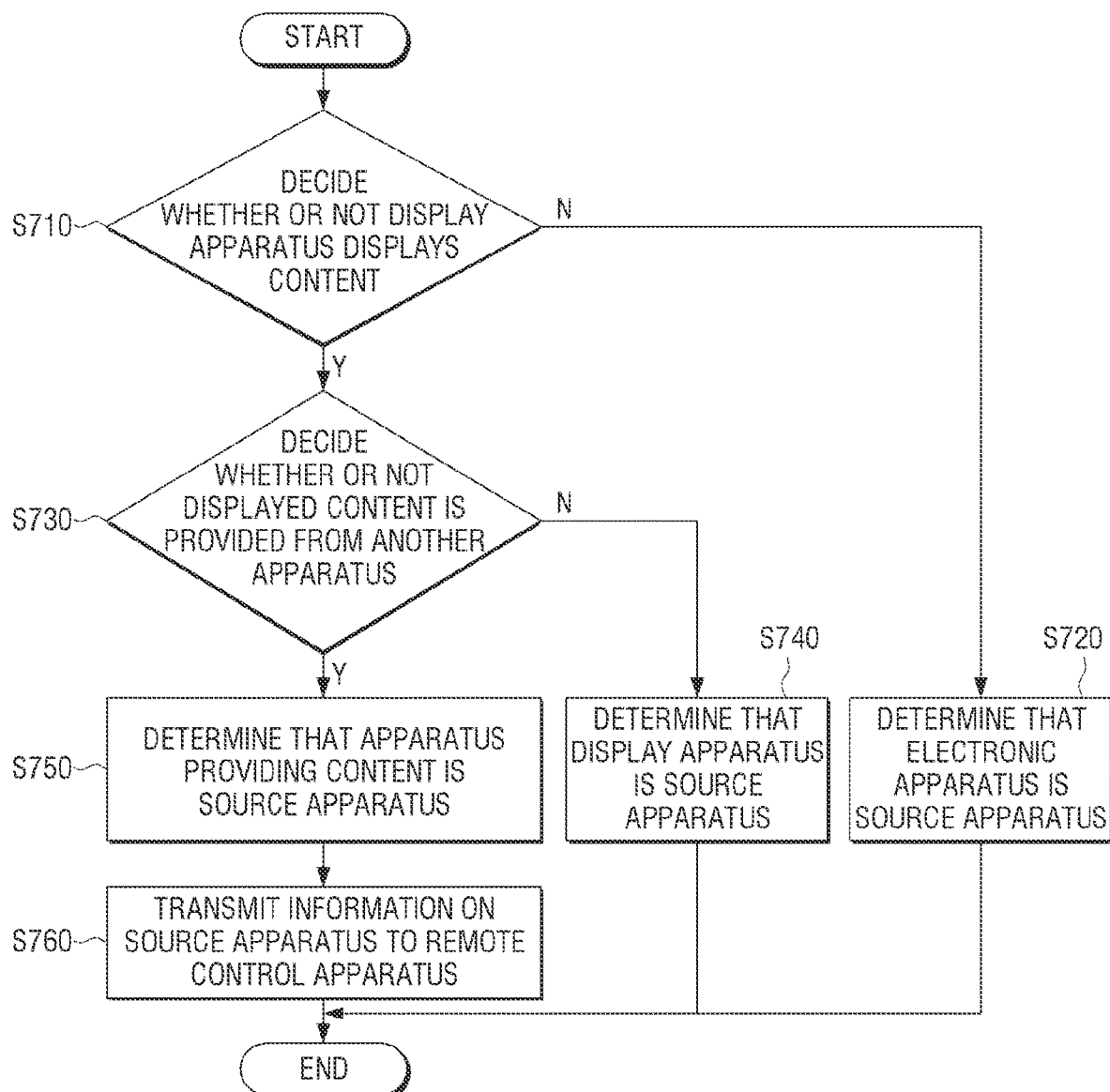
FIG. 7 is a flowchart illustrating an example method of determining a source apparatus according to an example embodiment of the present disclosure.

FIG. 7 is a flowchart illustrating an example determining method of a source apparatus according to an example embodiment of the present disclosure.

First, the electronic apparatus 100 decides whether or not the display apparatus displays a content (S710). For example, the electronic apparatus 100 may transmit a signal inquiring whether or not the content is displayed to the display apparatus. In the example in which the electronic apparatus 100 directly provides the content to the display apparatus, the electronic apparatus 100 may directly decide whether or not the content is displayed.

In the example in which the display apparatus does not display the content, the electronic apparatus 100 may determine that the electronic apparatus 100 is the source apparatus (S720). In this example, the remote control apparatus 200 controls the electronic apparatus 100.

In the example in which the display apparatus displays the content, the electronic apparatus 100 may decide whether or not the displayed content is provided from another apparatus (S730). For example, the electronic apparatus 100 may transmit a signal inquiring by which apparatus the content is provided to the display apparatus. Alternatively, in the case in which the electronic apparatus 100 directly provides the content to the display apparatus, the electronic apparatus 100 may not transmit an inquiry signal.

In the example in which the displayed content is not provided from another apparatus, the electronic apparatus 100 may determine that the display apparatus is the source apparatus (S740). For example, the electronic apparatus 100 may decide that the display apparatus directly receives the content from a broadcasting base station, or the like, and displays the received content. In this example, the remote control apparatus 200 controls the display apparatus.

In the example in which the displayed content is provided from another apparatus, the electronic apparatus 100 may determine that the apparatus providing the content is the source apparatus (S750).

When the source apparatus is determined, the electronic apparatus 100 may transmit information on the source apparatus to the remote control apparatus 200 (S760). The information on the source apparatus may include a control code set corresponding to the source apparatus as well as a manufacturer, a product name, and a serial number of the source apparatus.

Figure 8:
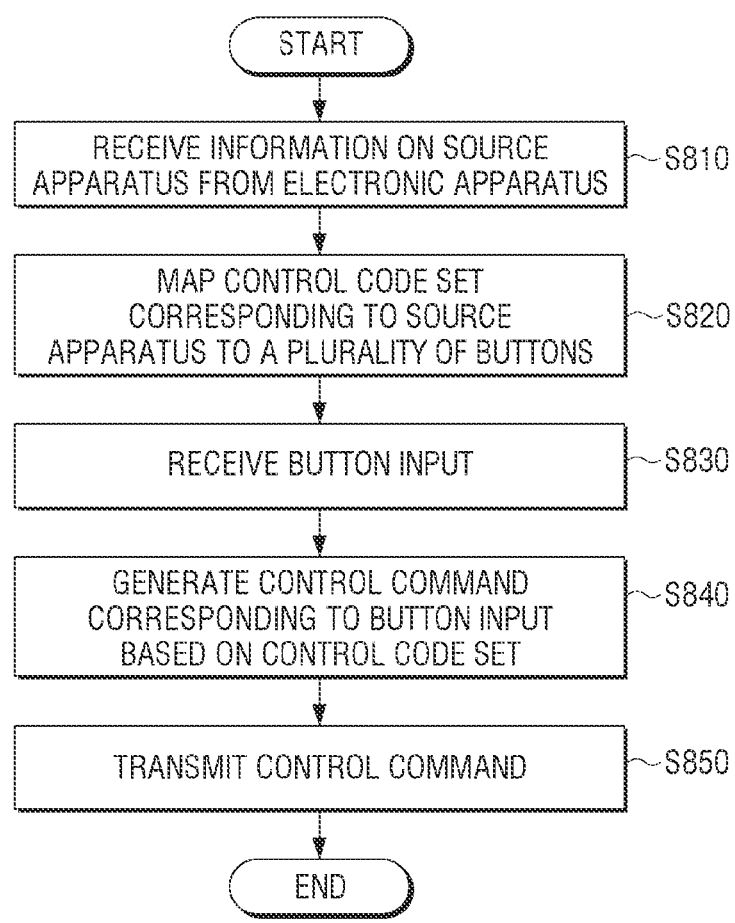
FIG. 8 is a flowchart illustrating example operations of a remote control apparatus according to an example embodiment of the present disclosure.

FIG. 8 is a flowchart illustrating example operations of a remote control apparatus 200 according to an example embodiment of the present disclosure.

First, the remote control apparatus 200 may receive information on the source apparatus from the electronic apparatus 100 (S810). The information on the source apparatus may include a control code set corresponding to the source apparatus as well as a manufacturer, a product name, and a serial number of the source apparatus.

Then, the remote control apparatus 200 may map a control code set corresponding to the source apparatus to a plurality of buttons (S820). The control code set corresponding to the source apparatus may be received from the electronic apparatus 100 or be stored in the storage 220 of the remote control apparatus 200.

In the example in which the control code set is mapped to the plurality of buttons, the control code set may not be mapped to special buttons. As described above, the special buttons, which are buttons specially provided in order to control a preset apparatus, are buttons for always controlling only the preset apparatus regardless of an apparatus currently controlled by the remote control apparatus 200.

Then, the remote control apparatus 200 may receive a button input (S830). The button input may be a button input for controlling the source apparatus. The button input may be a button input for controlling the preset apparatus using the special buttons.

The remote control apparatus 200 may generate a control command corresponding to the button input based on the control code set (S840), and transmit the generated control command (S850). For example, in the case in which the button input is the button input for controlling the source apparatus, the control code set may be a control code set corresponding to the source apparatus. In the example in which the button input is the button input for controlling the preset apparatus, the control code set may be a control code set corresponding to the preset apparatus.

The control code set corresponding to the preset apparatus may be mapped to the plurality of buttons including the special buttons.

Figure 9A:
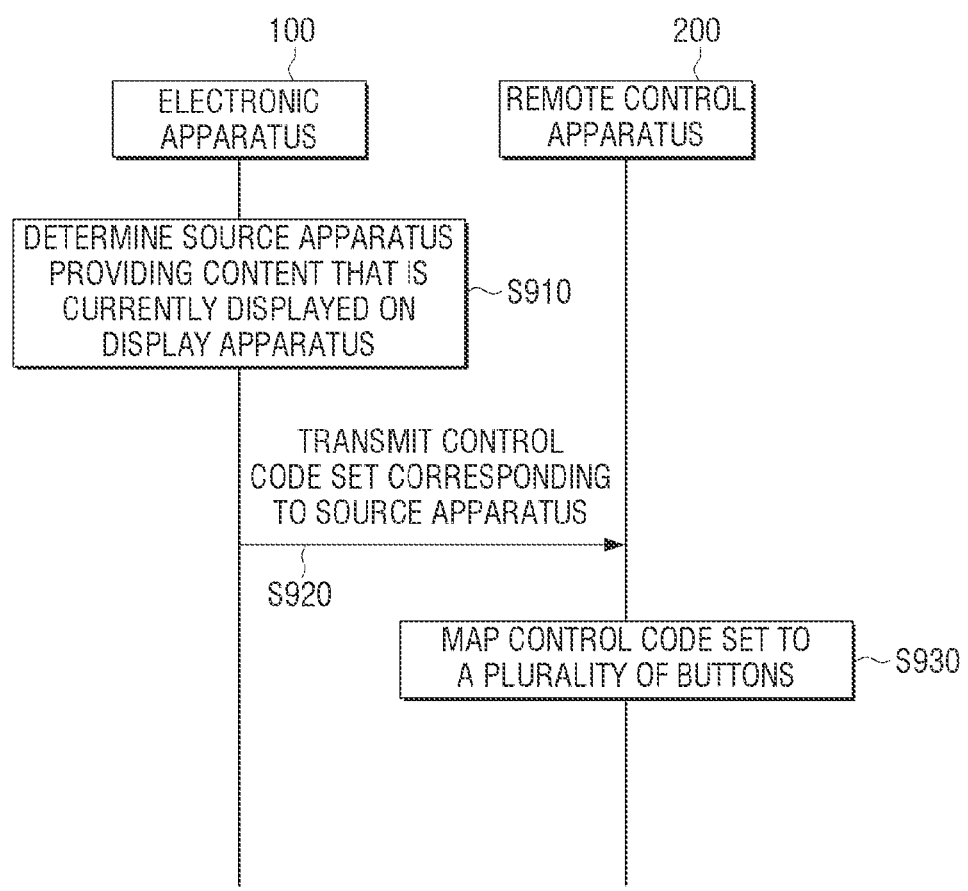
FIG. 9A is a sequence diagram illustrating example operations of an electronic system according to an example embodiment of the present disclosure.

FIG. 9A is a sequence diagram illustrating example operations of an electronic system according to an example embodiment of the present disclosure.

First, the electronic apparatus 100 determines the source apparatus providing the content that is currently displayed on the display apparatus (S910). For example, the electronic apparatus 100 stores control code sets corresponding to each of the display apparatus and the one or more external electronic apparatuses providing the content to the display apparatus therein.

The electronic apparatus 100 may determine the source apparatus by receiving information on the source apparatus from the display apparatus. In the example in which the electronic apparatus 100 provides one content to the display apparatus, the electronic apparatus 100 may also directly determine the information on the source apparatus.

The electronic apparatus 100 transmits the control code set corresponding to the source apparatus to the remote control apparatus 200 (S920). The control code set may be stored in the electronic apparatus 100 or be received from the external server.

The remote control apparatus 200 includes the plurality of buttons, and when the remote control apparatus 200 receives the control code set from the electronic apparatus 100, the remote control apparatus 200 may automatically map the received control code set to the plurality of buttons (S930). The remote control apparatus 200 may control the source apparatus using the plurality buttons to which the control code set is mapped.

Figure 9B:
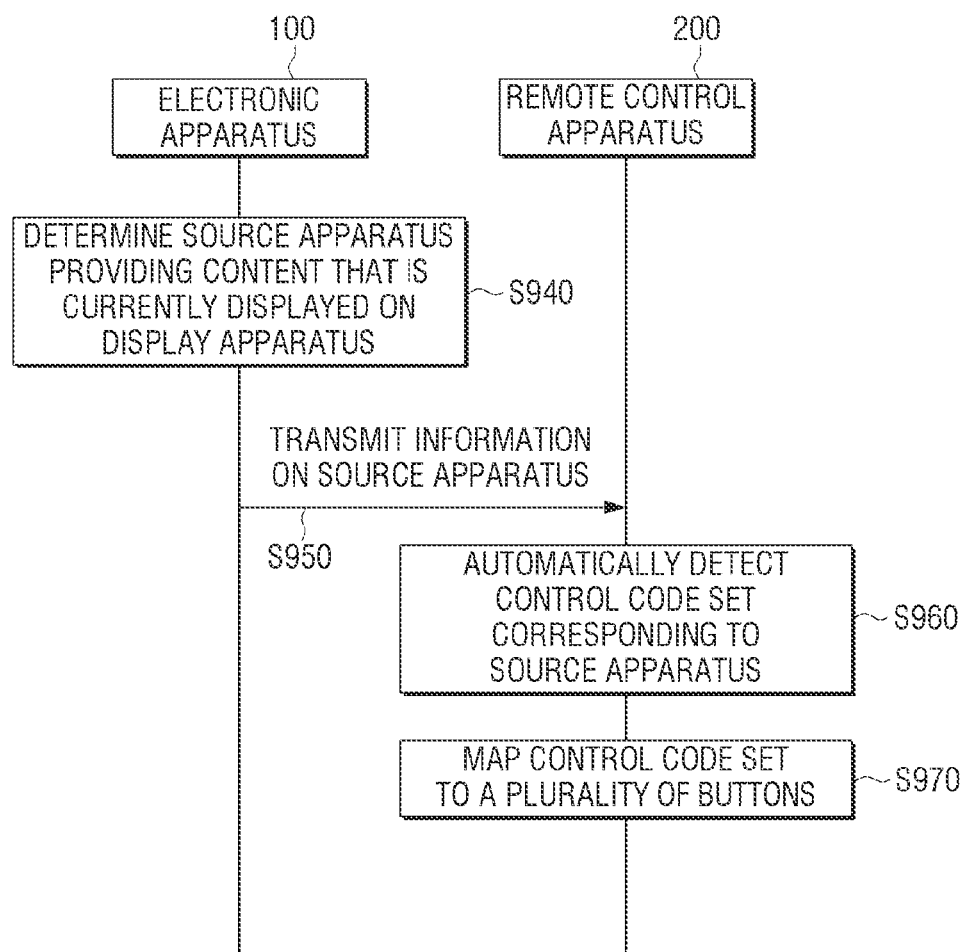
FIG. 9B is a sequence diagram illustrating example operations of an electronic system according to another example embodiment of the present disclosure.

FIG. 9B is a sequence diagram illustrating example operations of an electronic system according to another example embodiment of the present disclosure.

An example in which the electronic apparatus 100 stores the control code sets therein and transmits the control code set corresponding to the source apparatus to the remote control apparatus 200 has been described in FIG. 9A. FIG. 9B is a diagram for describing operations in the example in which the remote control apparatus 200 stores a plurality of control code sets therein.

First, the electronic apparatus 100 determines the source apparatus providing the content that is currently displayed on the display apparatus (S940). The electronic apparatus 100 may determine the source apparatus by receiving information on the source apparatus from the display apparatus or may directly determine the source apparatus.

The electronic apparatus 100 transmits the information on the source apparatus to the remote control apparatus 200 (S950). For example, the information on the source apparatus may not include the control code set.

When the information on the source apparatus providing the content that is currently displayed on the display apparatus is received from the electronic apparatus 100, the remote control apparatus 200 may automatically detect the control code set corresponding to the source apparatus (S960). For example, the control code set may be stored in the electronic apparatus 100 or be received from an external server.

Then, the remote control apparatus 200 may map the detected control code set to the plurality of buttons to control the source apparatus (S970).

Figure 10:
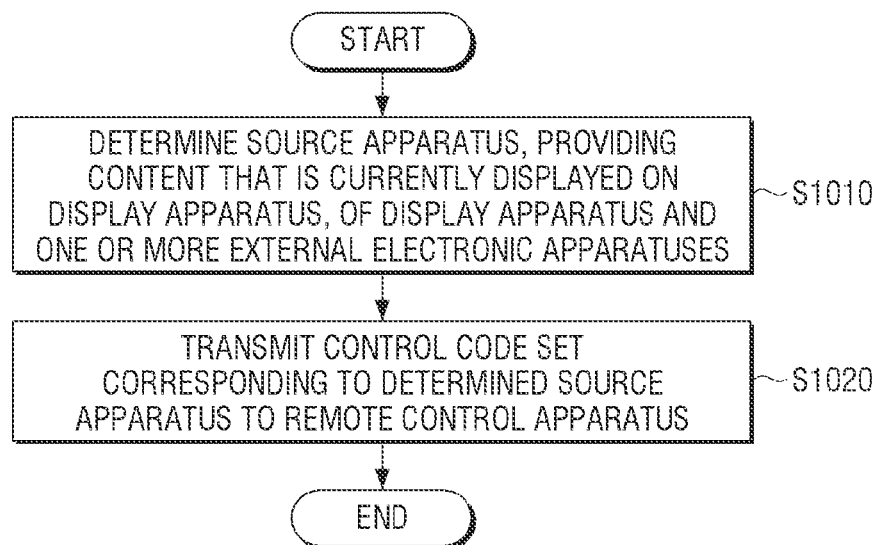
FIG. 10 is a flowchart illustrating an example control method of an electronic apparatus according to an example embodiment of the present disclosure.

FIG. 10 is a flowchart illustrating an example control method of an electronic apparatus according to an example embodiment of the present disclosure.

First, the source apparatus, providing the content that is currently displayed on the display apparatus, of the display apparatus and the one or more external electronic apparatuses, is determined (S1010). Then, the control code set corresponding to the determined source apparatus is transmitted to the remote control apparatus (S1020).

For example, in S1010, the information on the apparatus providing the content that is currently displayed on the display apparatus may be received from the display apparatus, and the source apparatus may be determined on the basis of the received information.

S1010 may include transmitting a content provided from any one of the one or more external electronic apparatuses to the display apparatus; and determining that the external electronic apparatus providing the content is the source apparatus.

In S1020, when the source apparatus providing the content that is currently displayed on the display apparatus is changed, a control code set corresponding to the changed source apparatus may be transmitted to the remote control apparatus 200.

The method of controlling an electronic apparatus may further include receiving the control code set corresponding to the determined source apparatus from the external server and storing the received control code set in the storage, when the source apparatus is determined.

Figure 11:
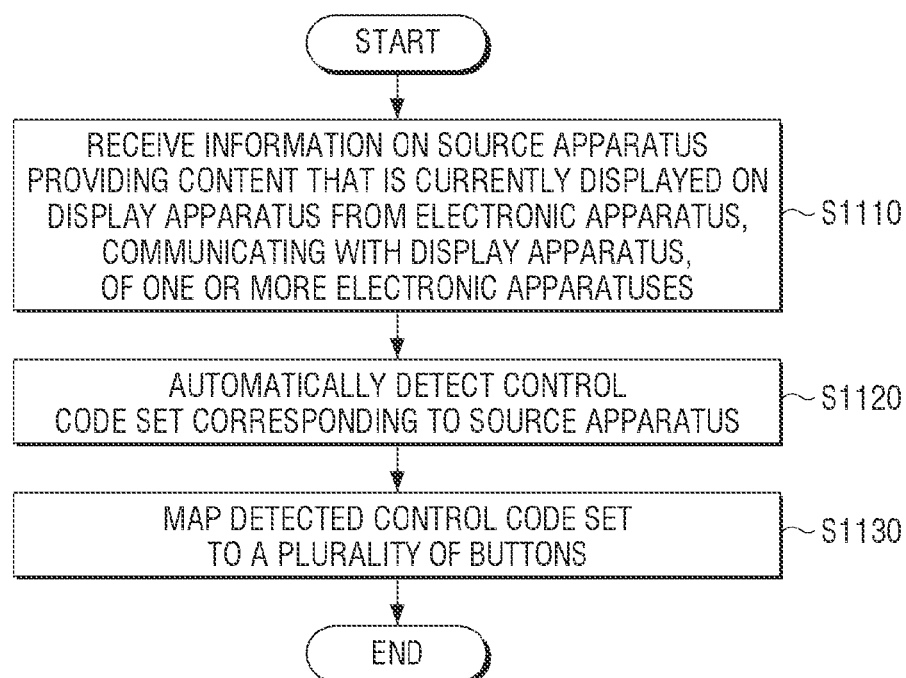
FIG. 11 is a flowchart illustrating an example control method of a remote control apparatus according to an example embodiment of the present disclosure.

FIG. 11 is a flowchart illustrating an example control method of a remote control apparatus according to an example embodiment of the present disclosure.

First, information on the source apparatus providing the content that is currently displayed on the display apparatus is received from the main apparatus, communicating with the display apparatus, of the one or more external electronic apparatuses (S1110). Then, the control code set corresponding to the source apparatus is automatically detected (S1120). Then, the detected control code set is mapped to the plurality of buttons (S1130).

In addition, the control method of a remote control apparatus further includes transmitting a signal requesting the main apparatus to transmit the control code set corresponding to the source apparatus in the case in which the control code set corresponding to the source apparatus is not stored in the storage, and in S1130, the control code set received from the main apparatus may be mapped to the plurality of buttons.

In addition, the control method of a remote control apparatus may further include receiving a pressing manipulation input of the first button and mapping the control code set corresponding to the main apparatus to the plurality of buttons.

In addition, the control method of a remote control apparatus may further include receiving a pressing manipulation input of the second button after the first button is pressing-manipulated and returning to a button mapping state immediately before the first button is pressing-manipulated.

Figure 12:
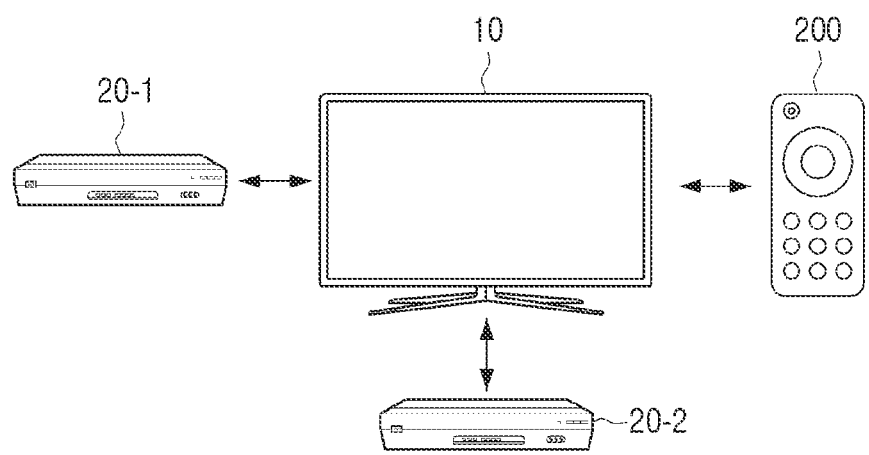
FIG. 12 is a diagram illustrating a modified example of the present disclosure.

FIG. 12 is a diagram illustrating a modified example of the present disclosure.

Although a case in which the electronic apparatus is a separate apparatus has been described hereinabove, FIG. 12 illustrates that the display apparatus 10 and the electronic apparatus may be implemented integrally with each other.

For example, the electronic apparatus may be one component in the display apparatus 10. In this example, the display apparatus 10 may perform communication with the one or more external electronic apparatuses 20-1 and 20-2 and the remote control apparatus 200.

The display apparatus 10 may directly determine the source apparatus providing the content that is currently displayed, and transmit the information on the source apparatus to the remote control apparatus 200. For example, the display apparatus 10 may also transmit the control code set corresponding to the source apparatus to the remote control apparatus 200.

The remote control apparatus 200 may map the control code set corresponding to the source apparatus to the plurality of buttons, and control the source apparatus.

According to the various example embodiments of the present disclosure as described above, an apparatus to be controlled of the plurality of apparatuses may be automatically determined by the electronic apparatus, and the determined apparatus may be controlled by the remote control apparatus.

The method of controlling an electronic apparatus according to the various example embodiments of the present disclosure described above may be implemented by program codes that may be executed in a computer and be provided in the respective servers or apparatuses so as to be executed by a processor in a state in which it is stored in various non-transitory computer-readable media.

As an example, a non-transitory computer-readable medium in which a program may sequentially perform determining the source apparatus, providing the content that is currently displayed on the display apparatus, of the display apparatus and the one or more external electronic apparatuses and transmitting the control code set corresponding to the determined source apparatus to the remote control apparatus is stored may be provided.

The non-transitory computer-readable medium may refer, for example, to a medium that semi-permanently stores data therein and is readable by a device. For example, various applications or programs described above may be stored and provided in the non-transitory computer-readable medium such as a compact disk (CD), a digital versatile disk (DVD), a hard disk, a Blu-ray disk, a universal serial bus (USB), a memory card, a read only memory (ROM), or the like.

Although the example embodiments of the present disclosure have been illustrated and described hereinabove, the present disclosure is not limited to any particular example embodiment described above, but may be variously modified by those skilled in the art to which the present disclosure pertains without departing from the scope and spirit of the disclosure as claimed in the claims. These modifications should also be understood to fall within the scope of the present disclosure.

What is claimed is:

1. A display apparatus comprising:
a display;
a communicator comprising communication circuitry; and
a processor configured to:
while a content is being displayed on the display, receive a first control signal from a remote control apparatus through the communicator;
in response to receiving the first control signal and based on identifying that the display apparatus is providing content currently being displayed, perform an operation of the display apparatus according to the first control signal; and
in response to receiving the first control signal and based on identifying that an external apparatus is providing the content currently being displayed, control the communicator to transmit information associated with the external apparatus to the remote control apparatus, for causing the remote control apparatus to transmit a second control signal for controlling an operation of the external apparatus, corresponding to the information, to the external apparatus.

2. The display apparatus claimed in claim 1, wherein the information associated with the external apparatus comprises a control code corresponding to the first control signal.

3. The display apparatus claimed in claim 1, wherein the information associated with the external apparatus comprises at least one of a product name, a serial number, and a manufacturer.

4. The display apparatus as claimed in claim 1, wherein the processor is further configured to, based on a source of a content that is currently being displayed on the display being changed from the external apparatus to another external apparatus, control to transmit information associated with the other external apparatus to the remote control apparatus.

5. The display apparatus claimed in claim 1, wherein the display apparatus further comprises a storage configured to store one or more control code sets corresponding to the external apparatus.

6. The display apparatus as claimed in claim 5, wherein the processor is further configured to, based on a control code set corresponding to the identified external apparatus not being stored in the storage, control to transmit a request for the control code set corresponding to the identified external apparatus to an external server, and receive the control code set from the external server.

7. The display apparatus as claimed in claim 1, wherein the display apparatus is configured to communicate with the remote control apparatus based on at least one of Bluetooth, Wifi, or Infra-Red (IR).

8. A display apparatus comprising:
a communicator comprising communication circuitry; and
a processor configured to:
based on receiving a content from an external apparatus, identify the external apparatus which provided the content which is currently displayed on the display apparatus,
identify a control code set corresponding to the identified external apparatus, and
control the communicator to transmit the identified control code set to a remote control apparatus to enable the remote control apparatus to control the identified external apparatus.

9. The display apparatus as claimed in claim 8, wherein the processor is further configured to, based on the external apparatus providing the content that is currently displayed on the display apparatus being changed, transmit a control code set corresponding to a changed external apparatus to the remote control apparatus.

10. The display apparatus as claimed in claim 8, further comprising:
a storage; and
wherein the processor is further configured to, based on the control code set corresponding to the identified external apparatus not being stored in the storage, request on the control code set corresponding to the identified external apparatus to an external server, and receive the control code set from the external server.

11. The display apparatus as claimed in claim 8, wherein the processor is further configured to identify whether there is a content that is currently displayed, and based on identifying that there is no content that is currently displayed, control to transmit the control code set corresponding to the display apparatus to the remote control apparatus.

12. A method of controlling a display apparatus, comprising:
- based on receiving a content from an external apparatus, identifying the external apparatus which provides the content which is currently displayed on the display apparatus,
- identifying a control code set corresponding to the identified external apparatus, and
- transmitting the identified control code set to a remote control apparatus to enable the remote control apparatus to control the identified external apparatus.

13. The method as claimed in claim 12, wherein the transmitting the identified control code set comprises, based on the identified external apparatus providing the content that is currently displayed on the display apparatus being changed, transmitting a control code set corresponding to a changed identified external apparatus to the remote control apparatus.

14. The method as claimed in claim 12, further comprising: based on the control code set corresponding to the identified external apparatus being not stored in the display apparatus, requesting on the control code set corresponding to the identified external apparatus to an external server, and receiving the control code set from the external server.

15. The method as claimed in claim 12, further comprising:
- identifying whether there is a content that is currently displayed; and
- based on identifying that there is no content that is currently displayed, transmitting the control code set corresponding to the display apparatus to the remote control apparatus.

\* \* \* \* \*